United States Patent
Aparicio Ojea et al.

(10) Patent No.: US 10,303,148 B2
(45) Date of Patent: May 28, 2019

(54) AUTOMATIC COMPRESSION ALGORITHM SELECTION AND PARAMETER TUNING BASED ON CONTEXTUAL KNOWLEDGE

(71) Applicant: Siemens Aktiengesellschaft, München (DE)

(72) Inventors: Juan L. Aparicio Ojea, Doylestown, PA (US); Justinian Rosca, West Windsor, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/522,449

(22) PCT Filed: Oct. 29, 2014

(86) PCT No.: PCT/US2014/062796
§ 371 (c)(1),
(2) Date: Apr. 27, 2017

(87) PCT Pub. No.: WO2016/068895
PCT Pub. Date: May 6, 2016

(65) Prior Publication Data
US 2017/0315531 A1     Nov. 2, 2017

(51) Int. Cl.
G06K 9/36      (2006.01)
G05B 19/05    (2006.01)
G05B 19/418  (2006.01)

(52) U.S. Cl.
CPC ......... *G05B 19/05* (2013.01); *G05B 19/4183* (2013.01); *G05B 2219/13103* (2013.01);
(Continued)

(58) Field of Classification Search
CPC ................ G05B 19/054; G05B 19/058; G05B 2219/1105; G05B 2219/3111;
(Continued)

(56) References Cited

U.S. PATENT DOCUMENTS 5,040,233 A * 8/1991 Davy ..................... G06T 9/00
358/1.9
2005/0071744 A1* 3/2005 Dunbar ................. G11B 20/12
715/200

(Continued)

FOREIGN PATENT DOCUMENTS

CN    10119782 A    6/2008
CN    103399723 A   11/2013
(Continued)

OTHER PUBLICATIONS

PCT International Search Report dated Jun. 3, 2015 corresponding to PCT International Application No. PCT/US2014/062796 filed Oct. 29, 2014 (14 pages).
(Continued)

*Primary Examiner* — Amir Alavi

(57) ABSTRACT

A method of compressing signal data in an intelligent programmable logic controller includes the controller creating a process image area in a volatile computer-readable storage medium operably coupled to the controller. The intelligent programmable logic controller updates the process image area with contents comprising signal data associated with a production unit and applies a compression algorithm to the contents to generate compressed signal data. The compressed signal data is stored on a non-volatile computer-readable storage medium operably coupled to the controller. The controller annotates the signal data with automation system context information to generate contextualized data. Next, the controller performs a statistical comparison of the signal data and the compressed signal
(Continued)

data to generate statistical comparison results. Then, one or more compression parameters used by the compression algorithm may be automatically adjusted based on at least one of the statistical comparison and the contextualized data.

18 Claims, 6 Drawing Sheets

(52) U.S. Cl.
CPC ............. *G05B 2219/14055* (2013.01); *G05B 2219/31323* (2013.01); *Y02P 90/10* (2015.11); *Y02P 90/18* (2015.11); *Y02P 90/24* (2015.11)

(58) Field of Classification Search
CPC ...... G05B 2219/13144; G05B 23/0264; G05B 23/0243; G05B 23/027; G05B 19/05; G05B 19/4183; G06F 17/2785
See application file for complete search history.

(56) References Cited

U.S. PATENT DOCUMENTS

| | | | | |
|---|---|---|---|---|
| 2007/0083571 | A1* | 4/2007 | Meller | G06F 8/654 |
| 2010/0217657 | A1* | 8/2010 | Gazdzinski | G06Q 30/0251 |
| | | | | 705/14.5 |
| 2012/0221843 | A1* | 8/2012 | Bak | G06F 9/4418 |
| | | | | 713/100 |
| 2013/0268775 | A1* | 10/2013 | Hawkins | G06F 21/64 |
| | | | | 713/189 |
| 2014/0047106 | A1 | 2/2014 | Lueng | |
| 2016/0054720 | A1* | 2/2016 | Lo | G05B 19/056 |
| | | | | 700/87 |
| 2017/0315531 | A1* | 11/2017 | Aparicio Ojea | G05B 19/4183 |
| 2018/0181112 | A1* | 6/2018 | Wang | G05B 23/0264 |
| 2018/0224821 | A1* | 8/2018 | Lamparter | G05B 19/05 |

FOREIGN PATENT DOCUMENTS

| | | |
|---|---|---|
| CN | 102761540 A | 11/2014 |
| EP | 1921527 A2 | 5/2008 |

OTHER PUBLICATIONS

Piovoso M J et al.: "Process data chemometrics" Instrumentation and Measurement Technology Conference. Atlanta, May 14-16, 1991; [Instrumentation and Measurement Technology Conference], New York, IEEE, US, vol. Conf. 8, May 14, 1991 (May 14, 1991), pp. 608-612A, XP01003702.

Sang-Hyuck Han et al.: "An Architecture of Real-Time Historical Database System for Industrial Process Control and Monitoring", Computers t Networks, Systems and Industrial Engineering (CNSI)t 2011 First ACIS/JNU International Conference on I EEE. May 23, 2011 (May 23, 2011)t pp. 31-34, XP031895187 DOI: 10.1109/ CNSI.2011.25 ISBN: 978-1-4577-0180-1 p. 31-p. 33 / May 23, 2011.

Report of Examination; Chinese Patent Application No. 201480083060. 2; Filing Date: Oct. 29, 2014; 6 pages.

* cited by examiner

AUTOMATIC COMPRESSION ALGORITHM SELECTION AND PARAMETER TUNING BASED ON CONTEXTUAL KNOWLEDGE

This application is a national phase filing under 35 U.S.C. § 371 of International Patent Application No. PCT/US2014/062796, filed Oct. 29, 2014, which is incorporated herein by reference in its entirety.

TECHNICAL FIELD

The present invention relates generally to the automatic selection of signal compression algorithms and parameter tuning for such algorithms based context information related to the signal and the control environment. The disclosed technology may be applied to, for example, various automated production environments where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system.

PLCs are utilized in various industrial settings to control automation systems. Automation systems typically generate a large amount of data in their daily operations. This data may include, for example, sensor data, actuator and control program parameters, and information associated with service activities. However, in conventional automation systems, the higher automation layers (e.g., SCADA, MES) do not receive all available data from lower layers of the system due to limits in bandwidth and storage capacity. Moreover, the data that is received may include irrelevant information while important data points are missed. For example, the SCADA, MES layers perform periodic scanning of data at fixed time intervals. However, important data points between scanned times may be lost. This causes several undesired secondary effects on the automation system. For example, if data analytics are performed at higher automation layers based on low quality/fidelity data, important data may be lost causing the automation system to operate inefficiently or sub-optimally. Some storage can be provided at the control layer. However, the amount of data that can be stored by a control layer device is limited by the embedded nature of the storage medium it utilizes.

One way to reduce the overall burden on network bandwidth and device storage requirements is to utilize time-series compression techniques. Currently, time-series compression is performed based on one or more conventional algorithms. With collector compression (CC)—also called "dead band" compression—any data outside a predefined limit is discarded (e.g. temperature of +/− 0.1 degree Celsius). CC is useful for eliminating background noise and preventing redundant data to be stored. A second type of compression referred to as "archive compression (AC), "rate of change," or "swinging door" compression may also be applied. With AC, any data that falls within a slope range will be compressed out.

An important parameter in compression algorithms is the compression deviation or deviation threshold. This parameter defines when a new data point should be stored. For example, conceptually, the AC algorithm only stores a new data point if a straight line drawn between the last stored (i.e., historized) data point and the new data point does not come within the compression deviation of all the intermediate data points. Lower values of the compression deviation will let pass most of the points without compression, while higher values may compress too many points, jeopardizing the proper functionality of the algorithm. A precise value of the deviation threshold would allow the system to compress data and not lose information, i.e. capture all the relevant information that can influence offline analytics and discard the random or useless data. However, it is challenging to choose the parameter in the first place and how to adjust it over time, as there is no direct relationship between its value and the relevant data missed. In the worst case scenario, where it is not possible to pre-engineer the data, an incorrect value of the deviation threshold may have a negative effect on future data-driven process analysis.

SUMMARY

Embodiments of the present invention address and overcome one or more of the above shortcomings and drawbacks, by providing methods, systems, and apparatuses related to automating the selection of the deviation threshold by adding process specific knowledge and prioritizing which statistics should remain as close as possible to the original signal and which ones are not relevant. This technology is particularly well-suited for, but not limited to, various industrial automation settings.

According to some embodiments of the present invention a method of compressing signal data in an intelligent programmable logic controller includes the controller creating a process image area in a volatile computer-readable storage medium operably coupled to the controller. The intelligent programmable logic controller updates the process image area with contents comprising signal data associated with a production unit and applies a compression algorithm to the contents of the process image area to generate compressed signal data. The compressed signal data is stored on a non-volatile computer-readable storage medium operably coupled to the intelligent programmable logic controller. The controller annotates the signal data with automation system context information to generate contextualized data. Next, the controller performs a statistical comparison of the signal data and the compressed signal data to generate statistical comparison results. Then, one or more compression parameters used by the compression algorithm may be automatically adjusted based on at least one of the statistical comparison and the contextualized data.

Various modifications, refinements, and/or enhancements may be applied to aforementioned method in different embodiments of the present invention. For example, in some embodiments, the compression parameters comprise a new deviation threshold value used to configure a compression rate associated with the compression algorithm. The method may then further include the intelligent programmable logic controller determining that a time critical period is occurring based on the contextualized data and reducing an existing deviation threshold value by a predetermined amount. In some embodiments, the predetermined amount is equal to the existing deviation threshold value, thus making the new deviation threshold value zero. In some embodiments, the intelligent programmable logic controller selects a new compression algorithm based on the compression parameters, updates the process image area with new contents (e.g., new signal data associated with the production unit), and applies the new compression algorithm to the new contents in order to generate new compressed signal data. In some embodiments, the contextualized data may also be compressed and stored on the non-volatile computer-readable storage medium.

Examples of the automation system context information that may be utilized in the aforementioned method include, without limitation, an indication of a device that generated the signal data, a structural description of the automation system which includes the intelligent programmable logic controller, a system working mode indicator, information about a product that was produced when the contents of the process image area were generated, a description of automation software utilized by the controller, or a status indictor indicative of a status of the automation software while the contents of the process image area were generated.

The aforementioned method may be applied to a variety of systems, apparatuses, devices, and articles of manufactures. For example, in one embodiment, an article of manufacture for compressing signal data in an intelligent programmable logic controller includes a non-transitory, tangible computer-readable medium holding computer-executable instructions for performing the aforementioned method, with or without the modifications, refinements, and/or enhancements discussed above.

According to another embodiment of the present invention, an intelligent programmable logic controller includes a processor configured to execute according to a scan cycle; a volatile computer-readable storage medium comprising a process image area; a non-volatile computer-readable storage medium; and a plurality of controller components executed by the processor according to the scan cycle. In some embodiments, the plurality of controller components comprise a data transfer component, a contextualization component, and a historian component. The data transfer component is configured to update the process image area during each scan cycle with signal data associated with a production unit. The contextualization component annotates the signal data with automation system context information to generate contextualized data. The historian component is configured to apply a compression algorithm to the contents of the process image area during each scan cycle and store the compressed signal data on the non-volatile computer-readable storage medium. The historian component is further configured to perform a statistical comparison of the signal data and the compressed signal data to generate statistical comparison results and, then, automatically adjust compression parameters used by the compression algorithm based on at least one of the statistical comparison and the contextualized data. In some embodiments, the aforementioned controller components also include a data connector component configured to receive additional contextualized data from a second intelligent programmable logic controller. Then, the adjustment to the compression parameters may be further based on the additional contextualized data.

The configuration of the aforementioned historian component may be modified, refined, and/or enhanced in different embodiments of the present invention. For example, in one embodiment, the historian component includes an online statistics unit configured to generate first statistics based on the signal data and an offline statistics unit configured to generate second statistics based on the compressed signal data. The statistical comparison may then be performed based on the first statistics and the second statistics. In another embodiment, the historian component includes an online compression unit configured to execute one of a plurality of available compression algorithms during each scan cycle to generate the compressed signal data. In one embodiment, this online compression unit selects the compression algorithm based on the compression parameters. In some embodiments, the historian component stores descriptive information regarding the compression algorithm with the compressed signal data. In some embodiments, the historian component determines a deviation threshold value used to configure a compression rate associated with the compression algorithm.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to an intelligent programmable logic controller (PLC) which automates changes in the parameterization and related algorithms based on a combination of statistical information regarding the signal and contextual information such as, for example, control data and other information related to the automation environment. The technology described herein may be applied in a variety of settings where control systems are used including, without limitation, industrial production environments.

Various embodiments of the present invention are described in the context of a PLC which includes various components configured to provide an assortment of enhanced functions in control applications. This PLC, referred to herein as an "Intelligent PLC" is described in greater detail in U.S. application Ser. No. 14/467,125 entitled "Intelligent Programmable Logic Controller," the entirety of which is incorporated herein by reference. Briefly, the Intelligent PLC offers several technical features which may be present in various combinations and used in different embodiments of the present invention. The Intelligent PLC provides efficient data storage on control layer devices. More specifically, functionality of the control layer may be extended by an efficient storage mechanism for time series data (i.e., a "historian" function) which allows short-/mid-term archiving of high resolution time-stamped data. With high fidelity data, few, if any, events are lost. Efficient compression algorithms (e.g. a variation of swinging door) may be used to reduce storage and communication demands. Additionally, the techniques described herein may enhance selection and parameterization of the compression algorithms. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

Figure 1:
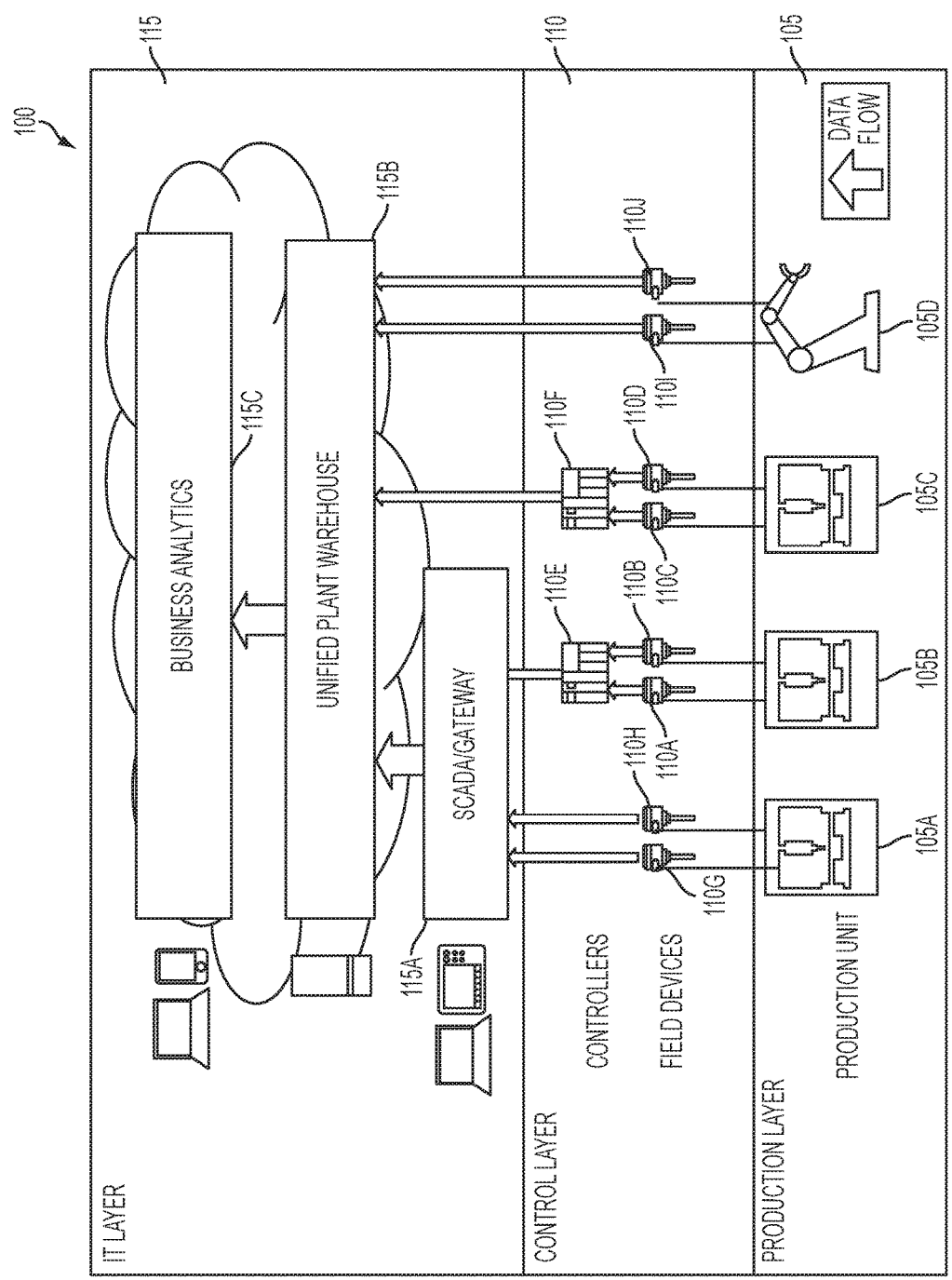
FIG. 1 provides a system view of an Intelligent PLCs integrated into an automation system, according to some embodiments of the present invention.

FIG. 1 provides a system view of Intelligent PLCs integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 115 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Additionally, in some embodiments, the Intelligent PLCs 110E and 110F provide data analytics functionality directly on their respectively device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionalities may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor, a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field devices known in the art may be used with the Intelligent PLC described herein. Example field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 1, Production Units 105B and 105C are connected through their respective field devices to Intelligent PLCs 110E and 110F, while Production Units 105A and 105D communicate directly through their respective Field Devices 110G, 110H, 110I, 110J to the Unified Plant Knowledge Warehouse 115B.

The Intelligent PLCs 110E and 110F may enrich data using additional context dimensions compared to state of the art systems (e.g., control knowledge, environmental conditions, and service incidences). Contextualization may be gathered via monitoring of the control program executing on the Intelligent PLCs 110E and 110F as well as the programs executing on external devices. For example, in some embodiments, devices in automation environment share data (e.g., on a periodic basis) via device-to-device communication procedures. Additionally, information from sources external to the automation system (e.g., weather information) may also be used. This allows insights to be made from data analytics with higher confidence and quality. In some embodiments, the system 100 uses semantic data representation languages and standards for contextualization of data in automation systems. This allows business analytics as well as SCADA-level historians (e.g., OSI PI asset framework) to be configured with minimal effort for integration with data from other systems/devices/sources. Also, system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

Figure 2:
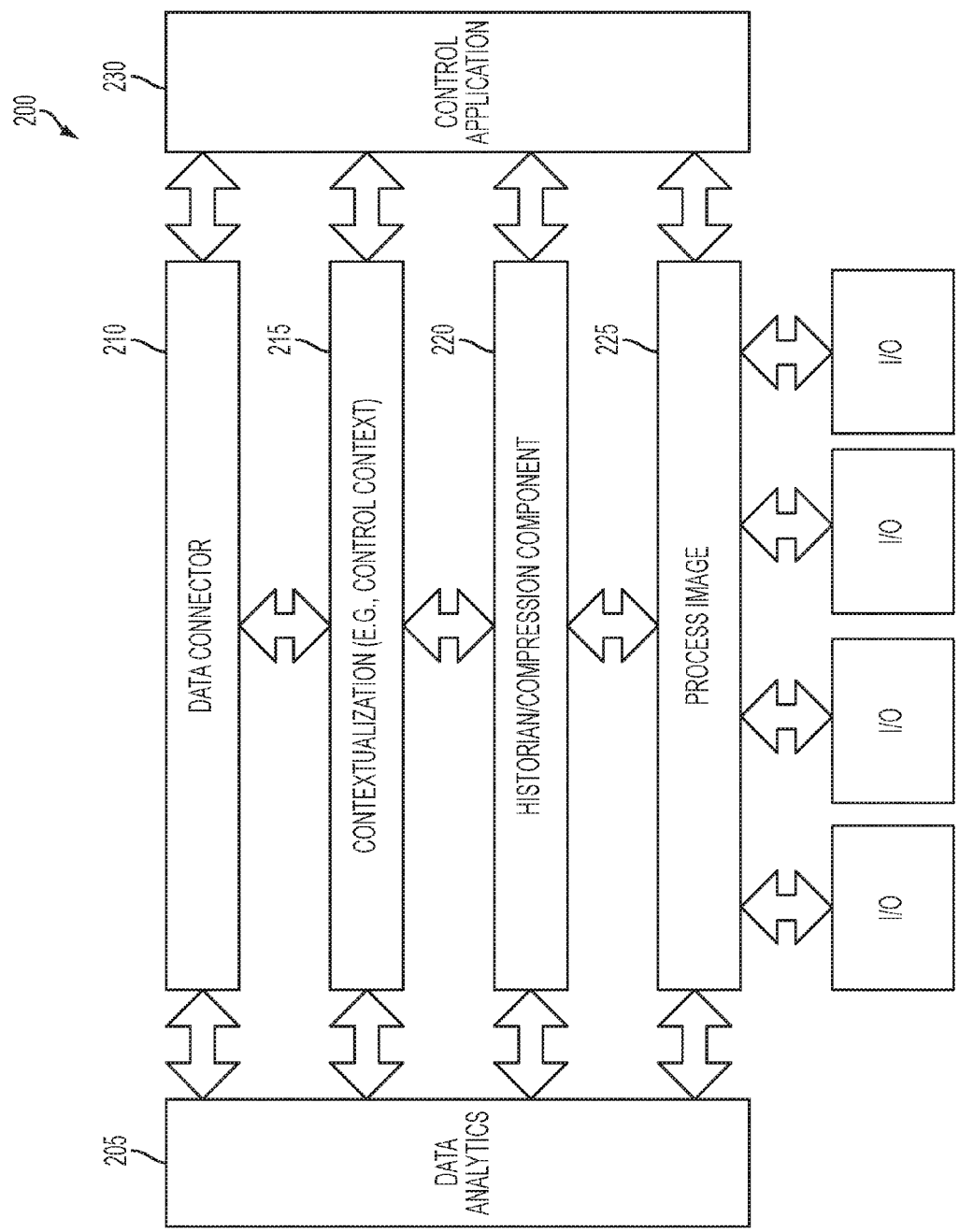
FIG. 2 provides an illustration of the system components included in an Intelligent PLC, according to some embodiments of the present invention.

FIG. 2 provides an illustration of the system components 200 included in an Intelligent PLC, according to some embodiments of the present invention. Process Image Component 225 is a memory area in a controller's CPU volatile system memory which is updated in each processing/scan cycle based on data associated with the production devices (e.g., the inputs and outputs of connected I/O). In each processing step, the Control Application 230 reads the Process Image Component 225, executes deployed application logic, and writes results back into the Process Image Component 225.

Continuing with reference to FIG. 2, the process image of each cycle is read and permanently stored on a non-volatile physical storage medium by the Historian Component 220. In some embodiments, this Historian Component 220 is configured to deploy data compression algorithms to reduce data volume. It thereby can provide applications with access to past process images. Data may be stored either for a fixed time window or online algorithms are used to realize dynamic caching heuristics. As part of the Historian Component 220, intelligent data generation algorithms may continuously analyze the Process Image Component 225 and context (via the Contextualization Component 215, as described below) to adjust data compression parameters. For example, based on contextualization information, the Historian Component 220 may identify a condition (e.g., alarm or error) and react by increasing the sampling rate, thereby producing higher fidelity data. Additionally, in some embodiments, the Historian Component may use information from the Process Image Component 225 and context knowledge to intelligently select from a plurality of different available compression algorithms. An example compression parameter tuning process that may be utilized by the Historian Component 220 is described below with reference to FIGS. 3A and 3B. In addition, in some embodiments, the compression algorithm used to compress a signal may be historized by the Historian Component 220 along with the signal data, thus providing context to how the signal was compressed.

It should be noted that the inclusion of the compression functionality in the Historian Component 220 is only illustrative of this embodiment of the system components 200 of an Intelligent PLC. In other embodiments, the functionality associated with compression may be placed in an entirely separate component, and arranged among the other components of the Intelligent PLC in a manner that optimizes the operation of the controller.

The Data Analytics Component 205 comprises a set of data analysis algorithms that process the current or past process images (queried from the Historian Component 220). Various data analysis algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the Data Connector Component 210. Thus, the Intelligent PLC may be viewed as a device for providing distributed analytics to the other devices in the automation system.

A Contextualization Component 215 annotates incoming data with context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component is configured to provide data to any of the other components for more specific processing needs. The context information generated by the Contextualization Component 215 may not be restricted to the asset structure but may also include control knowledge, product-specific information, process information, event information, and potentially other aspects such as external events like weather information. Some context information may be imported from engineering tools (e.g. Siemens Totally Integrated Automation tools). Additionally, in some embodiments, the Contextualization Component 215 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

Any data captured or generated by the components of system 200 may be provided to external components via a Data Connector Component 210. In some embodiments, the Data Connector Component 210 delivers data via a push methodology (i.e., actively sending to external component). In other embodiments, a pull methodology may be used where data is queried by external component). Additionally, push and pull methodologies may be combined in some embodiments such that the Intelligent PLC is configured to handle both forms of data transfer. Moreover, in some embodiments, the Data Connector Component 210 is used to provide device-to-device communication with other PLCs in the automation environment, thereby allowing contextualization information and other relevant data to be shared.

Figure 3A:
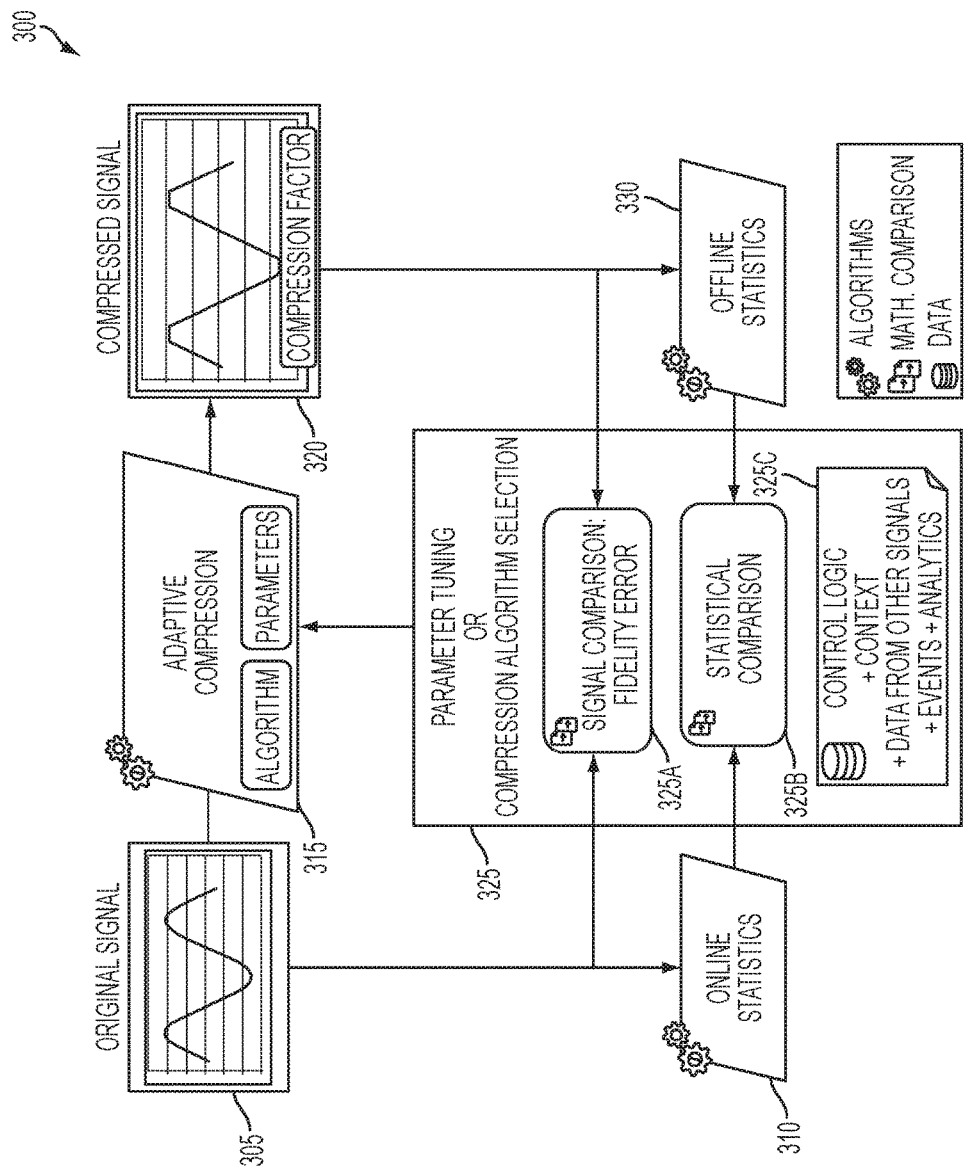
FIG. 3A provides a conceptual overview of an adaptive compression framework employed by an Intelligent PLC, according to some embodiments of the present invention.

FIG. 3A provides a conceptual overview of an adaptive compression framework 300 employed by an Intelligent PLC, according to some embodiments of the present invention. Briefly, one or more adaptive compression algorithms 315 are applied to an original signal 305 to generate a compressed signal 320. The adaptive compression algorithms 315 are adjusted based on output from a parameter tuning or compression algorithm selection process 325. The process 325 tunes parameters or selects compression algorithms based on three items: a signal comparison 325A, a statistical comparison 325B, and automation data 325C. The signal comparison 325A compares the original signal 305 and the compressed signal 320. Online statistics algorithms 310 and offline statistics algorithms 330 are applied to the original signal 305 and the compressed signal 320, respectively. The results of these algorithms 310, 330 are then used as input into the statistical comparison 325B. Finally, the automation data 325C used by the process 325 may include, for example, control logic, context information, data from other signals, event information, or analytics data. Additional information on this framework 300 is provided below with respect to FIG. 3B.

Figure 3B:
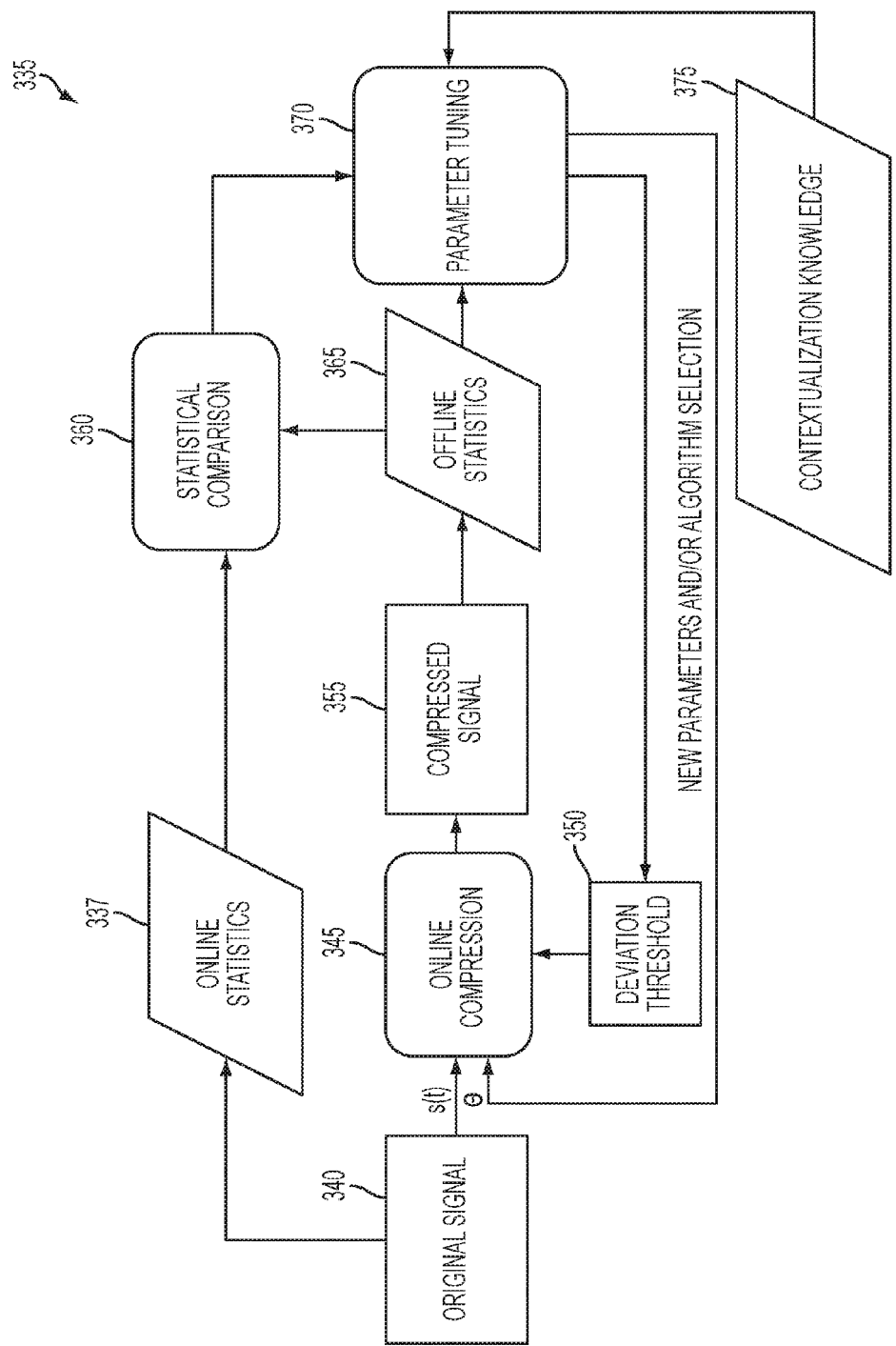
FIG. 3B provides an example of a compression parameter tuning process employed by an Intelligent PLC, according to some embodiments of the present invention FIG. 4 provides an example of dynamic deviation threshold tuning based on context information, according to some embodiments of the present invention.

FIG. 3B provides an example of a compression parameter tuning process 335 employed by an Intelligent PLC to implement the adaptive compression framework 300 illustrated in FIG. 3A, according to some embodiments of the present invention. At 315, an Original Signal 340 is compressed in an online mode. Various techniques may be used for the online compression including, for example, conventional algorithms, such as the "dead band" compression and the "swinging door" algorithm. The output of the Online Compression Component 345 is the Compressed Signal 355.

The Online Compression Component 345 includes three inputs: the Original Signal 340 (represented in FIG. 3 by "s(t)"), various parameters related to the compression algorithm(s) executed by the Online Compression Component 345 (represented by Θ) and a Deviation Threshold 350. The Deviation Threshold 350 provides to determine how much data should be compressed. More specifically, the Deviation Threshold 350 provides a definition of how much data can deviate between consecutive values before the change must be stored to maintain the desired fidelity of the data. For example, in the context of a "dead band algorithm," the Deviation Threshold 350 provides the dead compression bias used when comparing the differences between consecutive signal points. Thus, Online Compression Component 345 may only store one data point for a series of data points that are very similar. However, many data points may be stored if the data varies greatly between consecutive values. To optimize the compression, the Deviation Threshold 350 should be carefully selected. If the Deviation Threshold 350 is set to a small value, many (if not all) data points will be stored. Conversely, large values of the Deviation Threshold 350 result in little (if any) data being stored.

Online Statistics 337 are calculated in real-time or near real-time, directly from the Original Signal 340. Various statistics may be calculated in this manner including, without limitation, values related to location (e.g., mean, median, mode, etc.); dispersion (e.g., range, standard deviation, coefficient of variation, percentile, interquartile range); shape (e.g., variance, skewness, kurtosis, moments, l-moments); index of dispersion; min and max; correlations (e.g., Pearson product-moment correlation, rank correlation, partial correlation, etc.); and scatter plots. Additional useful statistics may be calculated over windows of time in the frequency domain. For example, statistics that contain additional information from the signal's spectral representation such as the energy distribution at different energy bands may be used.

The Online Statistics 337 offer a global description of the signal. However, they are calculated in a cumulative fashion, with every new point adding to a previously aggregated value. Such an approach may not provide optimal results when applied to the Compressed Signal 355. Accordingly, Offline Statistics 365 are calculated based on the Compressed Signal 355 to provide more flexibility over historical data. The Offline Statistics 365 may include various any of the statistics discussed above as being Online Statistics 337, as well as any additional statistics that can take advantage of the offline aspect of the calculations.

A Statistical Comparison 360 may then be performed using the Online Statistics 337 and the Offline Statistics 365. The fidelity of the compressed signal can be assessed using different metrics. For example, in some embodiments, the following equations are used:

$$\text{relative global error (\%)} = 100 * \frac{\sum_i (f_i - \hat{f}_i)^2}{\sum_i (f_i)^2}$$

$$\text{relative maximum error (\%)} = 100 * \frac{\max_i (|f_i - \hat{f}_i|)}{\max_i (|f_i|)}$$

where $f_i$ and $\hat{f}_i$ are the statistical data points associated with the Original Signal 340 and the Compressed Signal 355, respectively. In other embodiments, other indicators of compression performance known in the art may be used such as alternative statistical properties, non-linearity measures, and Harris index measures.

The results of the Statistical Comparison 360 of the Online Statistics 337 and Offline Statistics 365, along the Offline Statistics 365 themselves, are used in Parameter Tuning Component 370. In some embodiments, the Parameter Tuning Component 370 is configured to automatically determine a tradeoff between compression rate and fidelity lost, and select the deviation threshold accordingly. However, these metrics will only guarantee closeness between the compressed and the original data, but will not avoid storing redundant or useless information. In order to overcome that limitation, Contextualization Knowledge 375 is also used by the Parameter Tuning Component 370. This Contextualization Knowledge 375 may be gathered via the Contextualization Component 215 in the Intelligent PLC and may include, for example, control logic, process information, events and flags, and other signals. For example, in some embodiments, the Historian Component 220 in the Intelligent PLC is configured to perform compression on signal data. The Historian Component 220 may query the Contextualization Component 215 for specific or all known contextualization data about a particular signal, and adjust the compression algorithm accordingly.

Contextualization Knowledge 375 may be utilized in different ways by the Parameter Tuning Component 370, according to different embodiments, of the present invention. For example, in a multi-step control process, some periods of time may be more important than others. Thus, in some embodiments, the Contextualization Knowledge 375 is used to identify the different steps of the process and compress critical time periods at lower rate than less important ones. Additionally, in some embodiments, if the Contextualization Knowledge 375 indicates that an event was triggered (e.g., due to an error or alarm), signals involved in that process can be stored at lower compression rates (higher fidelity). When the alarm is cleared, the signal may automatically transition into a higher compression rate. As another example, if the Contextualization Knowledge 375 indicates that two similar signals are being historized by the Intelligent PLC and the desired information can be extracted from either signal, the high frequency information (usually expensive in terms of compression) may be maintained only for one of the signals. Moreover, it should be noted that the Contextualization Knowledge 375 may include context data received from different Intelligent PLCs, even those in different parts of the production environment. Thus, the Parameter Tuning Component 370 may adjust compression based not only on its owns understanding of the automation environment, but based on a holistic view of the environment that accounts for devices and components that may not be directly involved in the generation or use of the Original Signal 340.

The Parameter Tuning Component 370 provides outputs which are used by the Online Compression Component 345. The Deviation Threshold 350 used by the algorithm is adjusted to cause more or less data to be stored, depending on the results of the Parameter Tuning Component 370. For example, if the Parameter Tuning Component 370 determines that a critical time period is occurring (e.g., system error or failure), the Deviation Threshold 350 may be reduced to a minimum value such that all data values are stored. For example, in some embodiments, the Deviation Threshold 350 may be reduced by a pre-determined amount (e.g., 25%, 50%, 75%, etc.) during the time critical period. In some instances, the Deviation Threshold 350 may be reduced to zero, thus storing all data points and applying no compression to the incoming signal data.

Additionally, in some embodiments, the Online Compression Component 345 is configured with knowledge of key parameters used by the compression algorithms executed by the Online Compression Component 345. Thus, various parameters can be used to adjust the compression algorithm aside from Deviation Threshold 350. Moreover, as described below with reference to FIG. 5, the Parameter Tuning may also be used to select between different available compression algorithms (e.g., swinging door vs. dead band) based on the Statistical Comparison 360 and Contextualization Knowledge 375.

Figure 4:
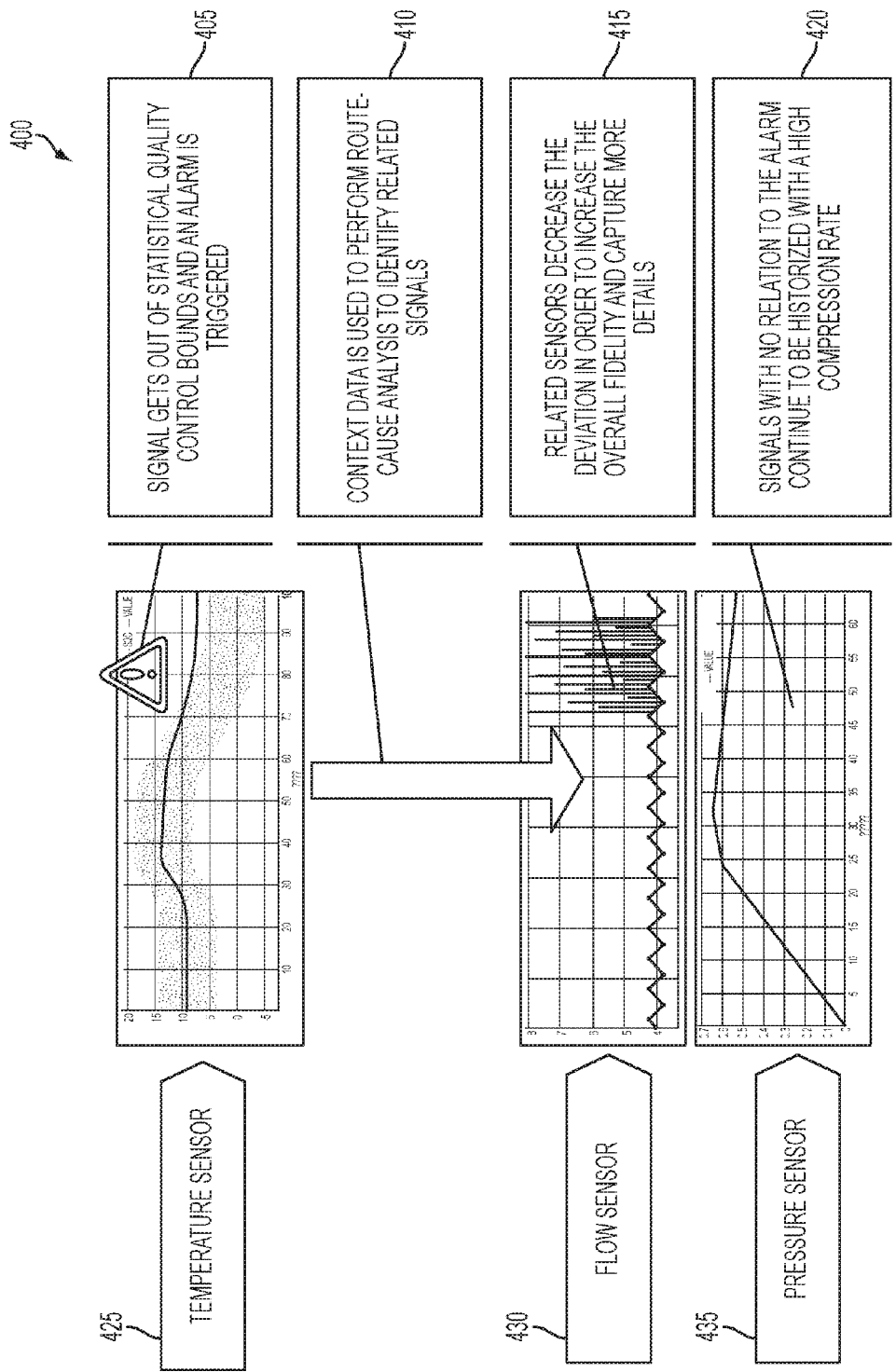

FIG. 4 provides an example of dynamic deviation threshold tuning process 400 based on context information, according to some embodiments of the present invention. This example illustrates how values may be tuned based on multiple signals. FIG. 4 includes signals from a Temperature Sensor 425, a Flow Sensor 430, and a Pressure Sensor 435. At 405, the signal from the Temperature Sensor 425 gets out of pre-defined statistical quality control bounds and an alarm is triggered. Next, at 410, the Intelligent PLC gathers context data and performs a route-cause analysis to identify sensors related to the signal from the Temperature Sensor 425. Data from the identified sensors will be historized at a high-fidelity to assist in data analysis. Thus, in the example of FIG. 4, the Flow Sensor 430 is identified as a related sensor and, at 415, the deviation threshold associated with this sensor is decreased in order to increase the overall fidelity and capture more details of the signal. Conversely, Pressure Sensor 435 is not identified as being related to the alarm. Accordingly, at 420, the signal from the Pressure Sensor 435 continues to be historized with a high compression rate (e.g., using a high deviation threshold value).

Figure 5:
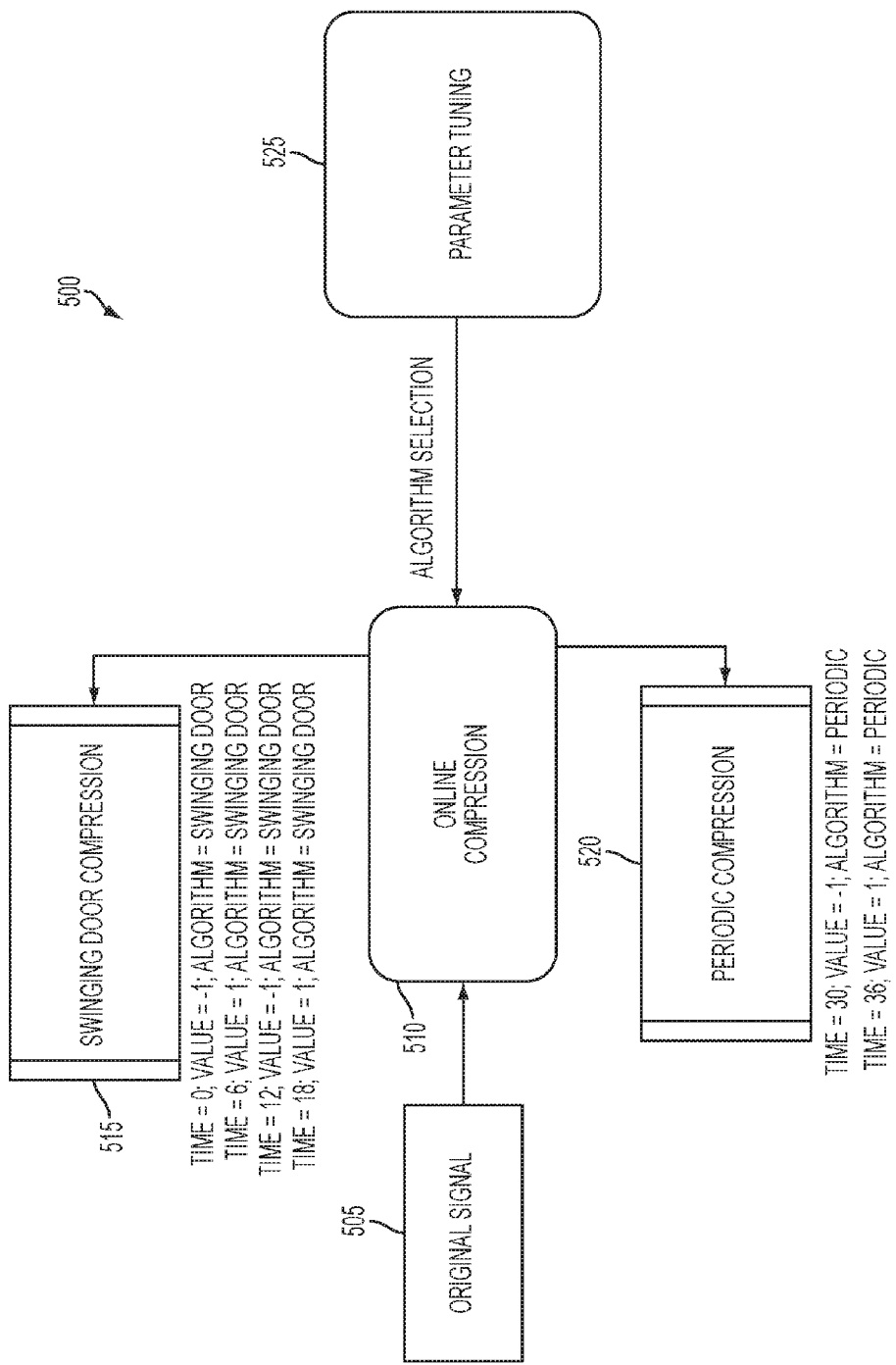
FIG. 5 provides an example of compression algorithm selection, according to some embodiments of the present invention.

FIG. 5 provides an example of a compression algorithm selection process 500, according to some embodiments of the present invention. This example highlights portions of FIG. 3 which may be used in the selection process. As shown in FIG. 5, the outcome of the analysis performed by the Parameter Tuning Component 525 (see FIG. 3), may be an entire new algorithm that fits better the characteristics of the Original Signal 505 and allow a higher compression rate. In this example, there are two compression algorithms available: a Swinging Door Compression 515 and a Periodic Compression 520. In other embodiments, additional compression algorithms may be used. In some cases, the algorithm selection process may be relatively simplistic. For example, if the Parameter Tuning Component 525 determines that the Original Signal 505 is periodic in nature, it may automatically send parameters to the Online Compression Component 510 to select Periodic Compression 520. Conversely, if the signal is not periodic, the parameters may specify use of Swinging Door Compression 515. Additionally, because the Parameter Tuning Component 525 has access to rich contextualization knowledge, algorithm selection can go beyond merely alternating based on the characteristics of the Original Signal 505.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of compressing signal data in a programmable logic controller, the method comprising:
creating, by the programmable logic controller, a process image area in a volatile computer-readable storage medium operably coupled to the programmable logic controller;
updating, by the programmable logic controller, the process image area with contents comprising signal data associated with a production unit;
applying, by the programmable logic controller, a compression algorithm to the contents of the process image area to generate compressed signal data;
storing, by the programmable logic controller, the compressed signal data on a non-volatile computer-readable storage medium operably coupled to the programmable logic controller;
annotating, by the programmable logic controller, the signal data with automation system context information to generate contextualized data;
performing, by the programmable logic controller, a statistical comparison of the signal data and the compressed signal data to generate statistical comparison results; and
automatically adjusting, by the programmable logic controller, one or more compression parameters used by the compression algorithm based on at least one of the statistical comparison and the contextualized data;
selecting, by the programmable logic controller, a new compression algorithm based on the one or more compression parameters;
updating, by the programmable logic controller, the process image area with new contents comprising new signal data associated with the production unit;
applying, by the programmable logic controller, the new compression algorithm to the new contents of the process image area to generate new compressed signal data; and
storing, by the programmable logic controller, the new compressed signal data on the non-volatile computer-readable storage medium operably coupled to the programmable logic controller.

2. The method of claim 1, wherein the one or more compression parameters comprises a new deviation threshold value used to configure a compression rate associated with the compression algorithm.

3. The method of claim 2, further comprising:
determining, by the programmable logic controller, that a time critical period is occurring based on the contextualized data;
reducing, by the programmable logic controller, an existing deviation threshold value by a predetermined amount to yield the new deviation threshold value.

4. The method of claim 3, wherein the predetermined amount is equal to the existing deviation threshold value and the new deviation threshold value is zero.

5. The method of claim 1, further comprising:
compressing, by the programmable logic controller, the contextualized data with the compression algorithm to yield compressed contextualized data; and
storing, by the programmable logic controller, the compressed contextualized data on the non-volatile computer-readable storage medium operably coupled to the programmable logic controller.

6. The method of claim 1, wherein the automation system context information comprises one or more of an indication of a device that generated the signal data, a structural description of an automation system comprising the programmable logic controller, a system working mode indicator, and information about a product that was produced when the contents of the process image area were generated.

7. The method of claim 1, wherein the automation system context information comprises one or more of a description of automation software utilized by the programmable logic controller or a status indictor indicative of a status of the automation software while the contents of the process image area were generated.

8. An programmable logic controller comprising:
a processor configured to execute according to a scan cycle;
a volatile computer-readable storage medium comprising a process image area;
a non-volatile computer-readable storage medium; and
a plurality of controller components executed by the processor according to the scan cycle, the plurality of controller components comprising:
a data transfer component configured to update the process image area during each scan cycle with contents comprising signal data associated with a production unit,
a contextualization component configured to annotate the signal data with automation system context information to generate contextualized data,
a historian component configured to:
(i) apply a compression algorithm to the contents of the process image area during each scan cycle to generate compressed signal data,
(ii) store the compressed signal data on the non-volatile computer-readable storage medium,
(iii) perform a statistical comparison of the signal data and the compressed signal data to generate statistical comparison results, and
(iv) automatically adjust one or more compression parameters used by the compression algorithm based on at least one of the statistical comparison and the contextualized data.

9. The programmable logic controller of claim 8, wherein the plurality of controller components further comprise:
a data connector component configured to receive additional contextualized data from a second programmable logic controller,
wherein the one or more compression parameters are further adjusted based on the additional contextualized data.

10. The programmable logic controller of claim 8, wherein the historian component comprises:
an online statistics unit configured to generate first statistics based on the signal data; and
an offline statistics unit configured to generated second statistics based on the compressed signal data,
wherein the statistical comparison is based on the first statistics and the second statistics.

11. The programmable logic controller of claim 10, wherein the historian component comprises an online compression unit configured to execute one of a plurality of available compression algorithms during each scan cycle to generate the compressed signal data.

12. The programmable logic controller of claim 11, wherein the online compression unit is configured to select the compression algorithm from the plurality of available compression algorithms based on the one or more compression parameters.

13. The programmable logic controller of claim 8, wherein the historian component is further configured to store descriptive information regarding the compression algorithm with the compressed signal data.

14. The programmable logic controller of claim 8, wherein the historian component is further configured to:
   determine a deviation threshold value used to configure a compression rate associated with the compression algorithm,
   wherein the one or more compression parameters comprises the deviation threshold value.

15. An article of manufacture for compressing signal data in an programmable logic controller, the article of manufacture comprising a non-transitory, tangible computer-readable medium holding computer-executable instructions for performing a method comprising:
   creating a process image area in a volatile computer-readable storage medium operably coupled to the programmable logic controller;
   updating the process image area with contents comprising signal data associated with a production unit;
   applying a compression algorithm to the contents of the process image area to generate compressed signal data;
   storing the compressed signal data on a non-volatile computer-readable storage medium operably coupled to the programmable logic controller;
   annotating the signal data with automation system context information to generate contextualized data;
   performing a statistical comparison of the signal data and the compressed signal data to generate statistical comparison results;
   automatically adjusting one or more compression parameters used by the compression algorithm based on at least one of the statistical comparison and the contextualized data;
   selecting a new compression algorithm based on the one or more compression parameters;
   updating the process image area with new contents comprising new signal data associated with the production unit;
   applying the new compression algorithm to the new contents of the process image area to generate new compressed signal data; and
   storing the new compressed signal data on the non-volatile computer-readable storage medium operably coupled to the programmable logic controller.

16. The article of manufacture of claim 15, wherein the one or more compression parameters comprises a new deviation threshold value used to configure a compression rate associated with the compression algorithm.

17. The article of manufacture of claim 16, wherein the method further comprises:
   determining that a time critical period is occurring based on the contextualized data;
   reducing an existing deviation threshold value by a predetermined amount to yield the new deviation threshold value.

18. The article of manufacture of claim 17, wherein the predetermined amount is equal to the existing deviation threshold value and the new deviation threshold value is zero.

* * * * *